US012745256B2

(12) United States Patent
Black et al.

(10) Patent No.: US 12,745,256 B2
(45) Date of Patent: Sep. 22, 2026

(54) SMART REPEATER SYSTEMS

(71) Applicant: Pivotal Commware, Inc., Bothell, WA (US)

(72) Inventors: Eric James Black, Bothell, WA (US); Mersad Cavcic, Kirkland, WA (US); Brian Mark Deutsch, Issaquah, WA (US); Andjela Ilic-Savoia, Pinellas Park, FL (US); Alexander Remley Katko, Seattle, WA (US); Steven Howard Ostroff, Sunrise, FL (US); Colby John Harper, Seattle, WA (US)

(73) Assignee: Pivotal Commware, Inc., Bothell, WA (US)

( * ) Notice: Subject to any disclaimer, the term of this patent is extended or adjusted under 35 U.S.C. 154(b) by 270 days.

(21) Appl. No.: 18/738,423

(22) Filed: Jun. 10, 2024

(65) Prior Publication Data

US 2025/0151068 A1 May 8, 2025

Related U.S. Application Data

(63) Continuation of application No. 17/980,391, filed on Nov. 3, 2022, now Pat. No. 12,010,703, which is a (Continued)

(51) Int. Cl.
*H04W 72/23* (2023.01)
*H04B 7/06* (2006.01)
*H04B 7/155* (2006.01)

(52) U.S. Cl.
CPC .......... *H04W 72/23* (2023.01); *H04B 7/0617* (2013.01); *H04B 7/155* (2013.01)

(58) Field of Classification Search
None
See application file for complete search history.

(56) References Cited

U.S. PATENT DOCUMENTS 2,131,108 A 9/1938 Lindenblad
4,464,663 A 8/1984 Lalezari et al.
(Continued)

FOREIGN PATENT DOCUMENTS

AU 2019239864 B2 2/2023
CA 2683315 C 10/2016
(Continued)

OTHER PUBLICATIONS

Extended European Search report for European Patent Application No. EP 22740187.4 mailed Nov. 14, 2024, 8 pages.
(Continued)

*Primary Examiner* — Hong S Cho
(74) *Attorney, Agent, or Firm* — John W. Branch; Branch Partners PLLC

(57) ABSTRACT

A system for 5G radio access networks, that enables smart RF signal repeater devices to perform many of the functions of a 5G base station to extend millimeter wave coverage for 5G communication networks while reducing costs, increasing versatility and optimizing coverage for user devices (UEs). The devices may include outdoor network repeaters and indoor subscriber repeaters, and other mmWave network transmitter devices in a mmWave network. Different types of 5G wireless communication networks may be employed including Open Radio Access Network (O-RAN), and Next Gen Radio Access Network (NG-RAN).

20 Claims, 5 Drawing Sheets

400

410: instructing a wireless repeater to adjust one or more beamforming antennas to point a plurality of beams at a corresponding plurality of user equipment devices according to a time schedule for communication between the wireless base station and the plurality of user equipment devices via the wireless repeater 420: receiving, from the wireless repeater, a plurality of detected locations for the plurality of user equipment devices 430: transmitting, to the wireless repeater, a beam schedule corresponding to the time schedule, where entries in the beam schedule correspond to the detected locations of the user equipment devices 440: transmitting, to the wireless repeater or to a radio unit in communication with the wireless repeater, downlink electromagnetic signals encoding downlink data to be delivered to the plurality of user equipment devices according to the time schedule 450: receiving, from the wireless repeater or from a radio unit in communication with the wireless repeater, uplink electromagnetic signals encoding uplink data from the plurality of user equipment devices according to the time schedule

Related U.S. Application Data continuation of application No. 17/585,418, filed on Jan. 26, 2022, now Pat. No. 11,497,050.

(60) Provisional application No. 63/174,511, filed on Apr. 13, 2021, provisional application No. 63/141,914, filed on Jan. 26, 2021.

(56) References Cited

U.S. PATENT DOCUMENTS 6,133,880 A 10/2000 Grangeat et al.
6,150,987 A 11/2000 Sole et al.
6,529,745 B1 3/2003 Fukagawa et al.
6,680,923 B1 1/2004 Leon
7,084,815 B2 8/2006 Phillips et al.
7,205,949 B2 4/2007 Turner
8,521,080 B2 8/2013 Sakoda et al.
8,711,989 B1 4/2014 Lee et al.
8,755,566 B1 6/2014 McLaughlin et al.
9,356,356 B2 5/2016 Chang et al.
9,385,435 B2 7/2016 Bily et al.
9,450,310 B2 9/2016 Bily et al.
9,551,785 B1 1/2017 Geer
9,608,314 B1 3/2017 Kwon et al.
9,635,456 B2 4/2017 Fenichel
9,711,852 B2 7/2017 Chen et al.
9,806,414 B2 10/2017 Chen et al.
9,806,415 B2 10/2017 Chen et al.
9,806,416 B2 10/2017 Chen et al.
9,812,779 B2 11/2017 Chen et al.
9,813,141 B1 11/2017 Marupaduga et al.
9,936,365 B1 4/2018 Elam
9,955,301 B2 4/2018 Markhovsky et al.
10,014,948 B2 7/2018 Ashrafi
10,020,891 B2 7/2018 Ashrafi
10,033,109 B1 7/2018 Gummalla et al.
10,153,845 B2 12/2018 Ashrafi
10,187,156 B2 1/2019 Ashrafi
10,225,760 B1 3/2019 Black
10,277,338 B2 4/2019 Reial et al.
10,313,894 B1 6/2019 Desclos et al.
10,324,158 B2 6/2019 Wang et al.
10,326,203 B1 6/2019 Black et al.
10,333,217 B1 6/2019 Black et al.
10,374,710 B2 8/2019 Ashrafi
10,419,948 B1 9/2019 Labadie et al.
10,425,905 B1 9/2019 Black et al.
10,431,899 B2 10/2019 Bily et al.
10,468,767 B1 11/2019 McCandless et al.
10,491,303 B2 11/2019 Ashrafi
10,505,620 B2 12/2019 Ito et al.
10,522,897 B1 12/2019 Katko et al.
10,524,154 B2 12/2019 Black
10,524,216 B1 12/2019 Black et al.
10,547,386 B2 1/2020 Ashrafi
10,594,033 B1 3/2020 Black et al.
10,673,646 B1 6/2020 Shinar et al.
10,734,736 B1 8/2020 McCandless et al.
10,862,545 B2 12/2020 Deutsch et al.
10,863,458 B2 12/2020 Black et al.
10,971,813 B2 4/2021 McCandless et al.
10,992,364 B2 * 4/2021 Tang .................... H04W 4/027
10,998,642 B1 5/2021 McCandless et al.
11,026,055 B1 6/2021 Rea
11,069,975 B1 7/2021 Mason et al.
11,088,433 B2 8/2021 Katko et al.
11,190,266 B1 11/2021 Black et al.
11,252,731 B1 * 2/2022 Levitsky ............. H04B 7/0695
11,279,480 B1 3/2022 Rezvani
11,297,606 B2 4/2022 Machado et al.
11,374,624 B2 6/2022 Deutsch et al.
11,424,815 B2 8/2022 Black et al.
11,431,382 B2 8/2022 Deutsch et al.
11,451,287 B1 9/2022 Sivaprakasam et al.
11,463,969 B2 * 10/2022 Li ........................ H04W 24/08
11,497,050 B2 11/2022 Black et al.
11,563,279 B2 1/2023 McCandless et al.
11,670,849 B2 6/2023 Mason et al.
11,706,722 B2 7/2023 Black et al.
11,757,180 B2 9/2023 McCandless et al.
11,843,955 B2 12/2023 Cavcic et al.
11,844,050 B2 12/2023 Machado et al.
11,848,478 B2 12/2023 Katko et al.
11,910,201 B2 2/2024 Ginis et al.
11,929,822 B2 3/2024 Black
11,937,199 B2 3/2024 Katko et al.
11,968,593 B2 4/2024 Rea
11,973,568 B2 4/2024 Black et al.
12,010,703 B2 6/2024 Black et al.
12,118,664 B2 10/2024 Ross et al.
12,177,697 B2 12/2024 Ginis et al.
12,185,453 B2 12/2024 McCandless et al.
12,362,472 B2 7/2025 McCandless et al.
12,425,987 B2 9/2025 Black et al.
12,495,377 B2 12/2025 Katko et al.
2001/0005406 A1 6/2001 Mege et al.
2002/0196185 A1 12/2002 Bloy
2003/0025638 A1 2/2003 Apostolos
2003/0062963 A1 4/2003 Aikawa et al.
2003/0151103 A1 8/2003 Endo et al.
2004/0003250 A1 1/2004 Kindberg et al.
2004/0038714 A1 2/2004 Rhodes et al.
2004/0229651 A1 11/2004 Hulkkonen et al.
2005/0237265 A1 10/2005 Durham et al.
2005/0282536 A1 12/2005 McClure et al.
2006/0025072 A1 2/2006 Pan
2007/0024514 A1 2/2007 Phillips et al.
2007/0147338 A1 6/2007 Chandra et al.
2007/0184828 A1 8/2007 Majidi-Ahy
2007/0202931 A1 8/2007 Lee et al.
2008/0039012 A1 2/2008 McKay et al.
2008/0049649 A1 2/2008 Kozisek et al.
2008/0181328 A1 7/2008 Harel et al.
2009/0086110 A1 4/2009 Beals et al.
2009/0153407 A1 6/2009 Zhang et al.
2009/0176487 A1 7/2009 DeMarco
2009/0207091 A1 8/2009 Anagnostou et al.
2009/0231215 A1 9/2009 Taura
2009/0296938 A1 12/2009 Devanand et al.
2010/0197222 A1 8/2010 Scheucher
2010/0207823 A1 8/2010 Sakata et al.
2010/0248659 A1 9/2010 Kawabata
2010/0302112 A1 12/2010 Lindenmeier et al.
2011/0070824 A1 3/2011 Braithwaite
2011/0199279 A1 8/2011 Shen et al.
2011/0292843 A1 12/2011 Gan et al.
2012/0064841 A1 3/2012 Husted et al.
2012/0094630 A1 4/2012 Wisnewski et al.
2012/0099856 A1 4/2012 Britz et al.
2012/0194399 A1 8/2012 Bily et al.
2013/0059620 A1 * 3/2013 Cho ...................... H04W 16/28 455/515
2013/0069834 A1 3/2013 Duerksen
2013/0141190 A1 6/2013 Kitaoka et al.
2013/0171986 A1 7/2013 Shimizu
2013/0231066 A1 9/2013 Zander et al.
2013/0303145 A1 11/2013 Harrang et al.
2013/0324076 A1 12/2013 Harrang
2014/0073337 A1 3/2014 Hong et al.
2014/0094217 A1 4/2014 Stafford
2014/0171811 A1 6/2014 Lin et al.
2014/0198684 A1 7/2014 Gravely et al.
2014/0266946 A1 9/2014 Bily et al.
2014/0269417 A1 9/2014 Yu et al.
2014/0293904 A1 10/2014 Dai et al.
2014/0308962 A1 10/2014 Zhang et al.
2014/0349696 A1 11/2014 Hyde et al.
2015/0109178 A1 4/2015 Hyde et al.
2015/0109181 A1 4/2015 Hyde et al.
2015/0116153 A1 4/2015 Chen et al.
2015/0131618 A1 5/2015 Chen
2015/0162658 A1 6/2015 Bowers et al.
2015/0222021 A1 8/2015 Stevenson et al.
2015/0229028 A1 8/2015 Bily et al.

(56) References Cited

U.S. PATENT DOCUMENTS

2015/0236777 A1 8/2015 Akhtar et al.
2015/0276926 A1 10/2015 Bowers et al.
2015/0276928 A1 10/2015 Bowers et al.
2015/0288063 A1 10/2015 Johnson et al.
2015/0318618 A1 11/2015 Chen et al.
2015/0372389 A1 12/2015 Chen et al.
2016/0037508 A1 2/2016 Sun
2016/0079672 A1 3/2016 Cerreno
2016/0087334 A1 3/2016 Sayama et al.
2016/0088648 A1 3/2016 Xue et al.
2016/0149308 A1 5/2016 Chen et al.
2016/0149309 A1 5/2016 Chen et al.
2016/0149310 A1 5/2016 Chen et al.
2016/0164175 A1 6/2016 Chen et al.
2016/0174241 A1 6/2016 Ansari et al.
2016/0198334 A1 7/2016 Bakshi et al.
2016/0219539 A1 7/2016 Kim et al.
2016/0241367 A1 8/2016 Irmer et al.
2016/0269964 A1 9/2016 Murray
2016/0302208 A1 10/2016 Sturkovich et al.
2016/0345221 A1 11/2016 Axmon et al.
2016/0365754 A1 12/2016 Zeine et al.
2016/0373181 A1* 12/2016 Black .................... H04W 16/28
2017/0033858 A1 2/2017 Calcev et al.
2017/0041807 A1 2/2017 Lotter
2017/0085357 A1 3/2017 Shahar
2017/0118750 A1 4/2017 Kikuma et al.
2017/0127295 A1 5/2017 Black et al.
2017/0127296 A1 5/2017 Gustafsson et al.
2017/0127332 A1 5/2017 Axmon et al.
2017/0142652 A1 5/2017 Liu et al.
2017/0155192 A1 6/2017 Black et al.
2017/0155193 A1 6/2017 Black et al.
2017/0187123 A1 6/2017 Black et al.
2017/0187426 A1 6/2017 Su et al.
2017/0194704 A1 7/2017 Chawgo et al.
2017/0195054 A1 7/2017 Ashrafi
2017/0238141 A1 8/2017 Lindoff et al.
2017/0310017 A1 10/2017 Howard
2017/0339575 A1 11/2017 Kim et al.
2017/0367053 A1 12/2017 Noh et al.
2017/0373403 A1 12/2017 Watson
2018/0013193 A1 1/2018 Olsen et al.
2018/0019798 A1 1/2018 Khan et al.
2018/0026683 A1 1/2018 Manholm et al.
2018/0027555 A1 1/2018 Kim et al.
2018/0054251 A1 2/2018 Alex
2018/0066991 A1 3/2018 Mueller et al.
2018/0076521 A1 3/2018 Mehdipour et al.
2018/0097286 A1 4/2018 Black et al.
2018/0123692 A1 5/2018 Leiba
2018/0139627 A1 5/2018 Ashworth et al.
2018/0152810 A1 5/2018 Wang et al.
2018/0177461 A1 6/2018 Bell et al.
2018/0219283 A1 8/2018 Wilkins et al.
2018/0227035 A1 8/2018 Cheng et al.
2018/0227445 A1 8/2018 Minegishi
2018/0233821 A1 8/2018 Pham et al.
2018/0270729 A1 9/2018 Ramachandra et al.
2018/0301821 A1 10/2018 Black et al.
2018/0322794 A1 11/2018 Beaurepaire et al.
2018/0337445 A1 11/2018 Sullivan et al.
2018/0351605 A1* 12/2018 Liang ..................... H04B 7/024
2018/0368389 A1 12/2018 Adams
2019/0020107 A1 1/2019 Polehn et al.
2019/0052428 A1 2/2019 Chu et al.
2019/0053013 A1 2/2019 Markhovsky et al.
2019/0067813 A1 2/2019 Igura
2019/0103910 A1 4/2019 Alford et al.
2019/0115972 A1 4/2019 Braun et al.
2019/0116605 A1 4/2019 Luo et al.
2019/0124696 A1 4/2019 Islam et al.
2019/0219982 A1 7/2019 Klassen et al.
2019/0221931 A1 7/2019 Black et al.
2019/0268780 A1 8/2019 Sarkar et al.
2019/0289482 A1 9/2019 Black
2019/0289560 A1 9/2019 Black et al.
2019/0293572 A1 9/2019 David et al.
2019/0336107 A1 11/2019 Hope Simpson et al.
2019/0372671 A1 12/2019 Ashrafi
2020/0008163 A1 1/2020 Black et al.
2020/0036413 A1 1/2020 Deutsch et al.
2020/0083605 A1 3/2020 Quarfoth et al.
2020/0083960 A1 3/2020 Ashrafi
2020/0091607 A1 3/2020 Black et al.
2020/0137698 A1 4/2020 Black et al.
2020/0186227 A1 6/2020 Reider et al.
2020/0205012 A1 6/2020 Bengtsson et al.
2020/0251802 A1 8/2020 Katko et al.
2020/0259552 A1 8/2020 Ashworth
2020/0266533 A1 8/2020 McCandless et al.
2020/0313741 A1 10/2020 Zhu et al.
2020/0358518 A1 11/2020 Tarighat Mehrabani
2020/0366363 A1 11/2020 Li et al.
2020/0396674 A1 12/2020 Yuan et al.
2020/0403689 A1* 12/2020 Rofougaran ....... H04B 7/15514
2021/0036437 A1 2/2021 Zhang et al.
2021/0037447 A1 2/2021 Tarighat Mehrabani
2021/0067237 A1* 3/2021 Sampath ........... H04W 74/0833
2021/0088337 A1 3/2021 Koubaa
2021/0159945 A1 5/2021 Deutsch et al.
2021/0167819 A1 6/2021 Deutsch et al.
2021/0176719 A1 6/2021 Black et al.
2021/0176805 A1 6/2021 Labadie et al.
2021/0185623 A1 6/2021 Black et al.
2021/0234591 A1 7/2021 Eleftheriadis et al.
2021/0289366 A1 9/2021 Ginis et al.
2021/0313677 A1 10/2021 McCandless et al.
2021/0328366 A1 10/2021 McCandless et al.
2021/0328664 A1 10/2021 Schwab et al.
2021/0367684 A1 11/2021 Bendinelli et al.
2021/0368355 A1 11/2021 Liu et al.
2021/0376912 A1 12/2021 Black et al.
2022/0014933 A1 1/2022 Moon et al.
2022/0038858 A1 2/2022 Rea
2022/0046565 A1 2/2022 Prakash et al.
2022/0053433 A1 2/2022 Abedini et al.
2022/0069894 A1 3/2022 Lehnich et al.
2022/0070802 A1 3/2022 Jain et al.
2022/0078762 A1 3/2022 Machado et al.
2022/0085498 A1 3/2022 Mason et al.
2022/0085866 A1 3/2022 Lilja
2022/0085869 A1 3/2022 Black et al.
2022/0102828 A1 3/2022 Katko et al.
2022/0110001 A1 4/2022 Ginis et al.
2022/0130108 A1 4/2022 Ross et al.
2022/0191129 A1 6/2022 Ross et al.
2022/0232396 A1 7/2022 Cavcic et al.
2022/0240305 A1 7/2022 Black et al.
2022/0302992 A1 9/2022 Sivaprakasam et al.
2022/0369295 A1 11/2022 Machado et al.
2023/0011531 A1 1/2023 Black
2023/0126395 A1 4/2023 McCandless et al.
2023/0155666 A1 5/2023 Black et al.
2023/0164796 A1 5/2023 Black et al.
2023/0171675 A1 6/2023 Lee et al.
2023/0224987 A1 7/2023 Kim et al.
2023/0337162 A1 10/2023 Katko et al.
2023/0354127 A1 11/2023 Fazili et al.
2024/0031953 A1 1/2024 Black et al.
2024/0039152 A1 2/2024 Mason et al.
2024/0154646 A1 5/2024 Wang et al.
2024/0222858 A1 7/2024 McCandless et al.
2024/0251256 A1 7/2024 Cavcic et al.
2024/0259831 A1 8/2024 Cavcic et al.
2024/0260006 A1 8/2024 Machado et al.
2024/0305349 A1 9/2024 Yu et al.
2024/0349164 A1 10/2024 Preston et al.
2024/0381371 A1 11/2024 Li et al.
2024/0405862 A1 12/2024 Black

(56) References Cited

U.S. PATENT DOCUMENTS

| | | | |
|---|---|---|---|
| 2024/0414671 | A1 | 12/2024 | Katko et al. |
| 2024/0422508 | A1 | 12/2024 | Rea |

FOREIGN PATENT DOCUMENTS

| | | | |
|---|---|---|---|
| CA | 3092509 | A1 | 9/2019 |
| CN | 102948089 | A | 2/2013 |
| CN | 103700951 | A | 4/2014 |
| CN | 106572622 | A | 4/2017 |
| CN | 106664124 | A | 5/2017 |
| CN | 106797074 | A | 5/2017 |
| CN | 108566646 | A | 9/2018 |
| CN | 109478900 | A | 3/2019 |
| CN | 110034416 | A | 7/2019 |
| CN | 110521277 | A | 11/2019 |
| CN | 111903063 | A | 11/2020 |
| EP | 3440778 | A1 | 10/2017 |
| EP | 3273629 | A1 | 1/2018 |
| EP | 3603329 | A1 | 9/2018 |
| EP | 3769429 | A1 | 9/2019 |
| EP | 3831115 | A1 | 2/2020 |
| EP | 3928380 | A1 | 8/2020 |
| EP | 3806345 | A1 | 4/2021 |
| EP | 4085494 | A1 | 7/2021 |
| EP | 4136759 | A1 | 10/2021 |
| EP | 4158796 | A1 | 12/2021 |
| EP | 4278645 | A1 | 7/2022 |
| EP | 4285628 | A1 | 8/2022 |
| EP | 3928380 | B1 | 3/2024 |
| JP | S61-1102 | A | 1/1986 |
| JP | S63-142901 | U | 9/1988 |
| JP | H0936656 | A | 2/1997 |
| JP | H09214418 | A | 8/1997 |
| JP | 2000-111630 | A | 4/2000 |
| JP | 3307146 | B2 | 7/2002 |
| JP | 2003-110322 | A | 4/2003 |
| JP | 2004-032046 | A | 1/2004 |
| JP | 2004-270143 | A | 9/2004 |
| JP | 3600459 | B2 | 12/2004 |
| JP | 2007-081648 | A | 3/2007 |
| JP | 2007-306273 | A | 11/2007 |
| JP | 2008-153798 | A | 7/2008 |
| JP | 2009-514329 | A | 4/2009 |
| JP | 2009-145930 | A | 7/2009 |
| JP | 2010-226457 | A | 10/2010 |
| JP | 2011-507367 | A | 3/2011 |
| JP | 2011-508994 | A | 3/2011 |
| JP | 2012-175189 | A | 9/2012 |
| JP | 2013-539949 | A | 10/2013 |
| JP | 2014-504086 | A | 2/2014 |
| JP | 2014-075788 | A | 4/2014 |
| JP | 2014-120847 | A | 6/2014 |
| JP | 2014-514907 | A | 6/2014 |
| JP | 2014-207626 | A | 10/2014 |
| JP | 2014-531826 | A | 11/2014 |
| JP | 2016-500214 | A | 1/2016 |
| JP | 2016-512408 | A | 4/2016 |
| JP | 2016-139965 | A | 8/2016 |
| JP | 2017-220825 | A | 12/2017 |
| JP | 2018-014713 | A | 1/2018 |
| JP | 2018-173921 | A | 11/2018 |
| JP | 2019-518355 | A | 6/2019 |
| JP | 2019-519956 | A | 7/2019 |
| JP | 2020-511890 | A | 4/2020 |
| JP | 2020-515162 | A | 5/2020 |
| JP | 2020-523863 | A | 8/2020 |
| JP | 2020-145614 | A | 9/2020 |
| JP | 2021-517406 | A | 7/2021 |
| JP | 6952700 | B2 | 10/2021 |
| JP | 2021-532683 | A | 11/2021 |
| JP | 2022-521286 | A | 4/2022 |
| JP | 2023-519067 | A | 5/2023 |
| JP | 2023-522640 | A | 5/2023 |
| JP | 2023-527384 | A | 6/2023 |
| JP | 7378414 | B2 | 11/2023 |
| JP | 2024-504621 | A | 2/2024 |
| JP | 2024-505881 | A | 2/2024 |
| JP | 7451491 | B2 | 3/2024 |
| JP | 7520861 | B2 | 7/2024 |
| JP | 7696908 | B2 | 6/2025 |
| KR | 10-2004-0006000 | A | 1/2004 |
| KR | 10-2005-0083901 | A | 8/2005 |
| KR | 10-2006-0031895 | A | 4/2006 |
| KR | 10-2006-0048953 | A | 5/2006 |
| KR | 10-2008-0093257 | A | 10/2008 |
| KR | 10-2012-0072144 | A | 7/2012 |
| KR | 10-2013-0080008 | A | 7/2013 |
| KR | 10-2016-0072062 | A | 6/2016 |
| KR | 10-2016-0113100 | A | 9/2016 |
| KR | 10-2019-0010545 | A | 1/2019 |
| KR | 10-2019-0133194 | A | 12/2019 |
| KR | 10-2020-0123254 | A | 10/2020 |
| KR | 10-2021-0048499 | A | 5/2021 |
| KR | 10-2021-0125579 | A | 10/2021 |
| KR | 10-2022-0129570 | A | 9/2022 |
| KR | 10-2023-0009895 | A | 1/2023 |
| KR | 10-2023-0017280 | A | 2/2023 |
| KR | 10-2023-0150811 | A | 10/2023 |
| KR | 10-2640129 | B1 | 2/2024 |
| KR | 10-2732844 | B1 | 11/2024 |
| KR | 10-2859809 | B1 | 9/2025 |
| KR | 10-2872581 | B1 | 10/2025 |
| TW | 202037208 | A | 10/2020 |
| WO | 03/017529 | A1 | 2/2003 |
| WO | 2007/001134 | A1 | 1/2007 |
| WO | 2009/075282 | A1 | 6/2009 |
| WO | 2010/104435 | A1 | 9/2010 |
| WO | 2012/050614 | A1 | 4/2012 |
| WO | 2012/096611 | A2 | 7/2012 |
| WO | 2012/161612 | A1 | 11/2012 |
| WO | 2013/023171 | A1 | 2/2013 |
| WO | 2015/196044 | A1 | 12/2015 |
| WO | 2016/044069 | A1 | 3/2016 |
| WO | 2017/008851 | A1 | 1/2017 |
| WO | 2017/014842 | A1 | 1/2017 |
| WO | 2017/176746 | A1 | 10/2017 |
| WO | 2017/193056 | A1 | 11/2017 |
| WO | 2018/144940 | A1 | 8/2018 |
| WO | 2018/175615 | A1 | 9/2018 |
| WO | 2018/179870 | A1 | 10/2018 |
| WO | 2019/005307 | A1 | 1/2019 |
| WO | 2019/139745 | A1 | 7/2019 |
| WO | 2019/183072 | A1 | 9/2019 |
| WO | 2019/183107 | A1 | 9/2019 |
| WO | 2020/027990 | A1 | 2/2020 |
| WO | 2020/060705 | A1 | 3/2020 |
| WO | 2020/076350 | A1 | 4/2020 |
| WO | 2020/095597 | A1 | 5/2020 |
| WO | 2020/163052 | A1 | 8/2020 |
| WO | 2020/171947 | A1 | 8/2020 |
| WO | 2021/003112 | A1 | 1/2021 |
| WO | 2021/137898 | A1 | 7/2021 |
| WO | 2021/211354 | A1 | 10/2021 |
| WO | 2021/242996 | A1 | 12/2021 |
| WO | 2022/031477 | A1 | 2/2022 |
| WO | 2022/056024 | A1 | 3/2022 |
| WO | 2022/155529 | A1 | 7/2022 |
| WO | 2022/164930 | A1 | 8/2022 |
| WO | 2023/283352 | A1 | 1/2023 |
| WO | 2023/076405 | A1 | 5/2023 |
| WO | 2023/205182 | A1 | 10/2023 |
| WO | 2024/072997 | A1 | 4/2024 |
| WO | 2024/108180 | A1 | 5/2024 |

OTHER PUBLICATIONS

Zhou et al., "Robotic Millimeter-Wave Wireless Networks", IEEE/ACM Transactions on Networking, vol. 28, No. 4, Aug. 1, 2020, pp. 1534-1549.

Zeng et al., "Accessing From The Sky: A Tutorial on UAV Communications for 5G and Beyond", arxiv.org, Cornell University Library, IEEE, Mar. 13, 2019, pp. 1-46.

(56) References Cited

OTHER PUBLICATIONS

Extended European Search report for European Patent Application No. EP 22746545.7 mailed Nov. 20, 2024, 8 pages.
Office Communication for Korean Patent Application No. KR 10-2022-7039537 mailed Apr. 1, 2025, 14 pages including English Translation.
Office Communication for U.S. Appl. No. 18/141,201 mailed Oct. 24, 2024, pp. 1-6.
Office Communication for U.S. Appl. No. 18/205,433 mailed Sep. 30, 2024, 14 Pages.
Office Communication for U.S. Appl. No. 17/974,278 mailed Nov. 21, 2024, 4 Pages.
Office Communication for U.S. Appl. No. 18/244,541 mailed Mar. 12, 2025, 6 Pages.
Office Communication for U.S. Appl. No. 18/529,995 mailed Oct. 16, 2024, 13 Pages.
Office Communication for U.S. Appl. No. 18/607,965 mailed Feb. 25, 2025, 14 Pages.
Office Communication for U.S. Appl. No. 18/642,120 mailed Mar. 11, 2025, 7 Pages.
Office Action for Canadian Patent Application No. 3,092,509 mailed Mar. 12, 2025, 4 Pages.
International Preliminary Report on Patentability Chapter I for International Patent Application No. PCT/US2023/018993 mailed Oct. 31, 2024, 7 Pages.
International Preliminary Report on Patentability Chapter I for International Patent Application No. PCT/US2023/034033 mailed Apr. 10, 2025, 5 Pages.
Office Communication for Japan Patent Application No. JP 2022-540857 mailed May 13, 2025, 5 pages including English Translation.
Office Communication for Japan Patent Application No. JP 2022-562458 mailed Mar. 27, 2025, 2 pages including English Translation.
Office Communication for Korean Patent Application No. KR 10-2021-7006085 mailed Feb. 26, 2025, 2 pages including English Translation.
Office Communication for Australian Patent Application No. AU 2020226298 mailed Oct. 8, 2024, 3 pages.
Extended European Search report for European Patent Application No. EP 22838415.2 mailed Mar. 27, 2025, 14 pages.
Office Communication for Japan Patent Application No. JP 2021-549237 mailed Jun. 11, 2024, 5 pages including English Translation.
"Automatic Cell Planning (ACP)", Forsk, Retrieved on Jul. 18, 2024, Webpage available at: <https://www.forsk.com/automatic-cell-planning-acp> 7 pages.
"NVIDIA Unveils 6G Research Cloud Platform to Advance Wireless Communications With AI", NVIDIA, Retrieved on Mar. 18, 2024, Available at <https://nvidianews.nvidia.com/news/nvidia-unveils-6g-research-cloud-platform-to-advance-wireless-communications-with-ai>, 2 pages.
Julien Berranger, "SIRADEL releases Bloonet its innovative solution for RAN design automation", SIRADEL, Retrieved on Oct. 21, 2021, Webpage available at: https://www.siradel.com/siradel-releases-bloonet-its-innovative-solution-for-ran-design-automation/, 6 pages.
"Mapbox Unveils Digital Twin in Partnership with Snowflake and Maxar to Revolutionize Telecom Visualization", Mapbox, Retrieved on Feb. 26, 2024, Webpage available at: https://www.mapbox.com/press-releases/mapbox-unveils-digital-twin-in-partnership-with-snowflake-and-maxar-to-revolutionize-telecom-visualization, 7 pages.
Monica Wamsley, "Blare Tech Builds 5G Network Planning Tools with CesiumJS", Cesium, Retrieved on Jan. 30, 2024, Webpage available at: https://cesium.com/blog/2024/01/30/blare-tech-builds-5g-network-planning-tools-with-cesiumjs/, 6 pages.
"Bridging the Gap Between Indoor and Outdoor Wireless", iBwave Reach, iBwave Solutions Inc., 1994-2020, 5 pages.
Terragraph Mesh, Retrieved on Jul. 18, 2024, Webpage Available at: <https://terragraph.com/assets/files/Terragraph_Mesh_Whitepaper-d906f1eb9c3ea7a8c1bbd8552b1f9f2d.pdf>, 11 pages.
"Canny edge detector", Scikit-image, Retrieved on Jul. 18, 2024, Webpage available at: <https://scikit-image.org/docs/stable/auto_examples/edges/plot_canny.html#sphx-glr-auto-examples-edges-plot-canny-py>, 2 pages.
"5G Fixed Wireless Access: Can FWA meet our cities needs?", Digital Twin Sim, Retrieved on Jul. 18, 2024, Webpage Available at: https://www.digitaltwinsim.com/fwa_modeling, 07 pages.
ETSI, "5G; Study on channel model for frequencies from 0.5 to 100 GHz (3GPP TR 38.901 version 17.1.0 Release 17)", ETSI TR 138 901, version 17.1.0, Release 17, Jan. 2024, 99 pages.
Office Communication for U.S. Appl. No. 18/530,034 mailed Jul. 15, 2024, pp. 1-7.
Office Communication for Japan Patent Application No. JP 2022-572655 mailed May 29, 2025, 4 pages including English Translation.
Office Communication for U.S. Appl. No. 18/141,201 mailed Jul. 8, 2025, 12 Pages.
Office Communication for U.S. Appl. No. 18/529,995 mailed Jun. 18, 2025, 10 Pages.
International Preliminary Report on Patentability Chapter I for International Patent Application No. PCT/US2023/080392 mailed May 30, 2025, 7 Pages.
Office Communication for Korean Patent Application No. KR 10-2022-7026864 mailed Jun. 10, 2025, 4 pages including English Translation.
Office Communication for Korean Patent Application No. KR 10-2021-7006085 mailed Aug. 20, 2024, 11 pages including English Translation.
Pandi et al., "Antenna beam forming using holographic artificial impedance surface", IEEE, Jul. 17, 2014, 16th International Symposium on ANTEM, pp. 1-2.
Examination Report No. 1 for Australian Patent Application No. 2020226298, mailed Aug. 27, 2024, pp. 1-2.
Office Communication for Korean Patent Application No. KR 10-2021-7029953 mailed Sep. 2, 2024, 5 pages including English Translation.
Office Communication for Korean Patent Application No. KR 10-2022-7026864 mailed Aug. 26, 2024, 13 pages including English Translation.
Office Communication for Japan Patent Application No. JP 2022-562458 mailed Sep. 5, 2024, 8 pages including English Translation.
Office Communication for U.S. Appl. No. 18/244,541 mailed Aug. 14, 2024, pp. 1-15.
Office Communication for U.S. Appl. No. 17/974,278 mailed Sep. 24, 2024, pp. 1-8.
Office Communication for U.S. Appl. No. 18/599,692 mailed Sep. 24, 2024, pp. 1-11.
Office Communication for Japan Patent Application No. JP 2022-540857 mailed Sep. 19, 2024, 14 pages including English Translation.
Office Communication for Japan Patent Application No. JP 2022-562458 mailed Sep. 5, 2024, 6 pages including English Translation.
Office Communication for U.S. Appl. No. 17/112,940 mailed Dec. 22, 2021, pp. 1-15.
Office Communication for U.S. Appl. No. 17/112,940 mailed Jul. 21, 2021, pp. 1-22.
Office Communication for U.S. Appl. No. 17/112,940 mailed Mar. 17, 2022, pp. 1-14.
Office Communication for U.S. Appl. No. 17/177,131 mailed Apr. 27, 2022, pp. 1-14.
Office Communication for U.S. Appl. No. 17/177,131 mailed Apr. 9, 2021, pp. 1-17.
Office Communication for U.S. Appl. No. 17/177,131 mailed Aug. 6, 2021, pp. 1-16.
Office Communication for U.S. Appl. No. 17/177,131 mailed Dec. 17, 2021, pp. 1-14.
Office Communication for U.S. Appl. No. 17/177,131 mailed Nov. 12, 2021, pp. 1-5.
Office Communication for U.S. Appl. No. 17/177,145 mailed Apr. 19, 2021, pp. 1-11.
Office Communication for U.S. Appl. No. 17/177,145 mailed Aug. 3, 2021, pp. 1-16.

(56) References Cited

OTHER PUBLICATIONS

Office Communication for U.S. Appl. No. 17/177,145 mailed Jun. 3, 2022, pp. 1-5.
Office Communication for U.S. Appl. No. 17/177,145 mailed Mar. 24, 2022, pp. 1-18.
Office Communication for U.S. Appl. No. 17/177,145 mailed Nov. 16, 2021, pp. 1-16.
Office Communication for U.S. Appl. No. 17/177,145 mailed Oct. 14, 2021, pp. 1-5.
Office Communication for U.S. Appl. No. 17/203,255 mailed Apr. 26, 2022, pp. 1-17.
Office Communication for U.S. Appl. No. 17/203,255 mailed May 5, 2022, pp. 1-2.
Office Communication for U.S. Appl. No. 17/217,882 mailed May 15, 2023, pp. 1-6.
Office Communication for U.S. Appl. No. 17/217,882 mailed Oct. 13, 2022, pp. 1-14.
Office Communication for U.S. Appl. No. 17/306,361 mailed Mar. 28, 2022, pp. 1-7.
Office Communication for U.S. Appl. No. 17/306,361 mailed Sep. 27, 2022, pp. 1-7.
Office Communication for U.S. Appl. No. 17/306,361 mailed Sep. 9, 2022, pp. 1-7.
Office Communication for U.S. Appl. No. 17/332,136 mailed Sep. 2, 2021, pp. 1-9.
Office Communication for U.S. Appl. No. 17/334,105 mailed Aug. 11, 2023, pp. 1-16.
Office Communication for U.S. Appl. No. 17/334,105 mailed Nov. 30, 2022, pp. 1-7.
Office Communication for U.S. Appl. No. 17/379,813 mailed Feb. 15, 2023, pp. 1-3.
Office Communication for U.S. Appl. No. 17/379,813 mailed Feb. 3, 2023, pp. 1-10.
Office Communication for U.S. Appl. No. 17/379,813 mailed Oct. 5, 2022, pp. 1-11.
Office Communication for U.S. Appl. No. 17/397,442 mailed Jun. 23, 2023, pp. 1-15.
Office Communication for U.S. Appl. No. 17/397,442 mailed Oct. 27, 2022, pp. 1-8.
Office Communication for U.S. Appl. No. 17/397,442 mailed Sep. 8, 2023, pp. 1-16.
Office Communication for U.S. Appl. No. 17/469,694 mailed Jan. 20, 2022, pp. 1-9.
Office Communication for U.S. Appl. No. 17/537,233 mailed Apr. 20, 2022, pp. 1-9.
Office Communication for U.S. Appl. No. 17/537,233 mailed Feb. 4, 2022, pp. 1-9.
Office Communication for U.S. Appl. No. 17/576,832 mailed Apr. 1, 2022, pp. 1-14.
Office Communication for U.S. Appl. No. 17/576,832 mailed Apr. 28, 2023, pp. 1-15.
Office Communication for U.S. Appl. No. 17/576,832 mailed Aug. 16, 2023, pp. 1-7.
Office Communication for U.S. Appl. No. 17/576,832 mailed Aug. 24, 2023, pp. 1-4.
Office Communication for U.S. Appl. No. 17/576,832 mailed Dec. 15, 2022, pp. 1-15.
Office Communication for U.S. Appl. No. 17/576,832 mailed Jul. 13, 2022, pp. 1-15.
Office Communication for U.S. Appl. No. 17/576,832 mailed Jul. 13, 2023, pp. 1-3.
Office Communication for U.S. Appl. No. 17/576,832 mailed Mar. 18, 2022, pp. 1-15.
Office Communication for U.S. Appl. No. 17/576,832 mailed Sep. 23, 2022, pp. 1-5.
Office Communication for U.S. Appl. No. 17/585,418 mailed Apr. 8, 2022, pp. 1-9.
Office Communication for U.S. Appl. No. 17/585,418 mailed Aug. 4, 2022, pp. 1-2.
Office Communication for U.S. Appl. No. 17/585,418 mailed Jul. 22, 2022, pp. 1-6.
Office Communication for U.S. Appl. No. 17/708,757 mailed Aug. 4, 2023, pp. 1-8.
Office Communication for U.S. Appl. No. 17/708,757 mailed Jan. 20, 2023, pp. 1-5.
Office Communication for U.S. Appl. No. 17/891,970 mailed Jun. 16, 2023, pp. 1-11.
Office Communication for U.S. Appl. No. 17/891,970 mailed Sep. 25, 2023, pp. 1-8.
International Search Report and Written Opinion for International Patent Application No. PCT/US2023/080392 mailed Feb. 27, 2024, 15 Pages.
Office Communication for U.S. Appl. No. 18/513,292 mailed Nov. 26, 2025, 22 Pages.
Office Communication for U.S. Appl. No. 18/529,995 mailed Jan. 15, 2026, 10 Pages.
Office Action for Chinese Patent Application No. 201980019925.1 mailed Sep. 27, 2021, 18 pages including English Translation.
Office Action for Japanese Patent Application No. JP 2020-548724 mailed Jun. 15, 2023, 06 Pages including English translation.
Office Action for Japanese Patent Application No. JP 2020-548724 mailed Mar. 8, 2023, 12 Pages including English translation.
Office Action for Japanese Patent Application No. JP 2021-505304 mailed May 9, 2023, 08 Pages including English translation.
Office Action for Korean Patent Application No. KR 10-2020-7029161 mailed Jul. 19, 2023, 16 Pages including English translation.
Office Communication for U.S. Appl. No. 15/870,758 mailed Apr. 16, 2019, pp. 1-10.
Office Communication for U.S. Appl. No. 15/870,758 mailed Oct. 1, 2018, pp. 1-12.
Office Communication for U.S. Appl. No. 15/925,612 mailed Dec. 19, 2018, pp. 1-12.
Office Communication for U.S. Appl. No. 15/925,612 mailed Jun. 15, 2018, pp. 1-9.
Office Communication for U.S. Appl. No. 16/049,630 mailed Apr. 12, 2019, pp. 1-13.
Office Communication for U.S. Appl. No. 16/049,630 mailed Aug. 19, 2020, pp. 1-18.
Office Communication for U.S. Appl. No. 16/049,630 mailed Aug. 7, 2019, pp. 1-13.
Office Communication for U.S. Appl. No. 16/049,630 mailed Dec. 9, 2019, pp. 1-13.
Office Communication for U.S. Appl. No. 16/049,630 mailed Feb. 18, 2020, pp. 1-5.
Office Communication for U.S. Appl. No. 16/049,630 mailed Jun. 24, 2019, pp. 1-5.
Office Communication for U.S. Appl. No. 16/049,630 mailed Mar. 31, 2020, pp. 1-15.
Office Communication for U.S. Appl. No. 16/049,630 mailed Oct. 15, 2020, pp. 1-14.
Office Communication for U.S. Appl. No. 16/049,630 mailed Oct. 4, 2018, pp. 1-13.
Office Communication for U.S. Appl. No. 16/136,119 mailed Mar. 15, 2019, pp. 1-8.
Office Communication for U.S. Appl. No. 16/136,119 mailed Nov. 23, 2018, pp. 1-12.
Office Communication for U.S. Appl. No. 16/268,469 mailed May 16, 2019, pp. 1-16.
Office Communication for U.S. Appl. No. 16/268,469 mailed Sep. 10, 2019, pp. 1-11.
Office Communication for U.S. Appl. No. 16/280,939 mailed Jul. 18, 2019, pp. 1-7.
Office Communication for U.S. Appl. No. 16/280,939 mailed May 13, 2019, pp. 1-22.
Office Communication for U.S. Appl. No. 16/292,022 mailed Jun. 7, 2019, pp. 1-13.
Office Communication for U.S. Appl. No. 16/292,022 mailed Sep. 23, 2019, pp. 1-9.
Office Communication for U.S. Appl. No. 16/358,112 mailed May 15, 2019, pp. 1-17.

(56) References Cited

OTHER PUBLICATIONS

Office Communication for U.S. Appl. No. 16/440,815 mailed Jan. 8, 2020, pp. 1-8.
Office Communication for U.S. Appl. No. 16/440,815 mailed Jul. 17, 2019, pp. 1-16.
Office Communication for U.S. Appl. No. 16/440,815 mailed Oct. 7, 2019, pp. 1-5.
Office Communication for U.S. Appl. No. 16/568,096 mailed Oct. 24, 2019, pp. 1-10.
Office Communication for U.S. Appl. No. 16/673,852 mailed Jun. 24, 2020, pp. 1-11.
Office Communication for U.S. Appl. No. 16/673,852 mailed Nov. 25, 2020, pp. 1-8.
Office Communication for U.S. Appl. No. 16/730,690 mailed Apr. 21, 2021, pp. 1-2.
Office Communication for U.S. Appl. No. 16/730,690 mailed Apr. 8, 2021, pp. 1-11.
Office Communication for U.S. Appl. No. 16/730,932 mailed Aug. 25, 2020, pp. 1-5.
Office Communication for U.S. Appl. No. 16/730,932 mailed Mar. 6, 2020, pp. 1-13.
Office Communication for U.S. Appl. No. 16/734,195 mailed Mar. 20, 2020, pp. 1-8.
Office Communication for U.S. Appl. No. 16/846,670 mailed Apr. 2, 2021, pp. 1-9.
Office Communication for U.S. Appl. No. 16/846,670 mailed Apr. 21, 2021, pp. 1-2.
Office Communication for U.S. Appl. No. 16/846,670 mailed Feb. 8, 2021, pp. 1-4.
Office Communication for U.S. Appl. No. 16/846,670 mailed Jun. 11, 2020, pp. 1-12.
Office Communication for U.S. Appl. No. 16/846,670 mailed Nov. 25, 2020, pp. 1-13.
Office Communication for U.S. Appl. No. 16/983,927 mailed Aug. 31, 2020, pp. 1-7.
Office Communication for U.S. Appl. No. 16/983,927 mailed Jan. 6, 2021, pp. 1-8.
Office Communication for U.S. Appl. No. 16/983,978 mailed Feb. 10, 2021, pp. 1-11.
Office Communication for U.S. Appl. No. 16/983,978 mailed Oct. 27, 2020, pp. 1-13.
Office Communication for U.S. Appl. No. 16/983,978 mailed Sep. 16, 2020, pp. 1-7.
Office Communication for U.S. Appl. No. 17/112,895 mailed Feb. 6, 2023, pp. 1-8.
Office Communication for U.S. Appl. No. 17/112,940 mailed Aug. 9, 2021, pp. 1-20.
Office Communication for European Patent Application No. EP 20908525.7 mailed Oct. 17, 2025, 8 pages.
Office Communication for Korean Patent Application No. KR 10-2022-7045890 mailed Sep. 5, 2025, 6 pages including English Translation.
Office Communication for U.S. Appl. No. 18/374,539 mailed Sep. 11, 2025, 17 Pages.
Office Communication for U.S. Appl. No. 18/529,995 mailed Aug. 6, 2025, 3 Pages.
Office Communication for U.S. Appl. No. 18/607,965 mailed Sep. 5, 2025, 9 Pages.
Office Communication for U.S. Appl. No. 18/607,965 mailed Oct. 31, 2025, 8 Pages.
First Examination Report for Indian Patent Application No. IN 202217074598 mailed Feb. 6, 2026, 13 pages.
Partial Supplementary European Search report for European Patent Application No. EP 23792450.1 mailed Feb. 11, 2026, 14 pages.
Nokia et al., "Discussion on UL time and frequency synchronization for NTN", 3GPP TSG RAN WG #102, R1-2006422, Aug. 17-29, 2020, 11 pages.
Office Communication for U.S. Appl. No. 18/136,238 mailed Jul. 20, 2023, pp. 1-8.
Search Report for Chinese Patent Application No. 201980019925.1 mailed on Sep. 19, 2021, pp. 1-2.
U.S. Appl. No. 14/510,947, filed Oct. 9, 2014, pp. 1-76.
U.S. Appl. No. 62/743,672, filed Oct. 10, 2018, pp. 1-278.
Office Communication for U.S. Appl. No. 17/334,105 mailed Oct. 25, 2023, pp. 4.
Office Communication for U.S. Appl. No. 18/136,238 mailed Oct. 25, 2023, pp. 1-9.
Office Communication for U.S. Appl. No. 17/859,632 mailed Aug. 8, 2023, pp. 1-14.
Office Communication for U.S. Appl. No. 17/859,632 mailed Feb. 28, 2023, pp. 1-13.
Office Communication for U.S. Appl. No. 17/859,632 mailed May 16, 2023, pp. 1-4.
Office Communication for U.S. Appl. No. 17/859,632 mailed Oct. 27, 2022, pp. 1-12.
Office Communication for U.S. Appl. No. 17/334,105 mailed Nov. 8, 2023, pp. 1-13.
Office Communication for U.S. Appl. No. 17/334,105 mailed Nov. 16, 2023, pp. 2.
Office Action for Japanese Patent Application No. JP 2021-505304 mailed Oct. 26, 2023, 06 Pages including English translation.
Office Action for Japanese Patent Application No. JP 2021-549237 mailed Oct. 16, 2023, 06 Pages including English translation.
Office Communication for U.S. Appl. No. 18/205,433 mailed Dec. 12, 2023, 17 Pages.
Office Communication for U.S. Appl. No. 17/974,278 mailed Mar. 28, 2024, pp. 1-8.
Office Communication for U.S. Appl. No. 17/859,632 mailed Dec. 18, 2023, 10 Pages.
Office Communication for Korean Patent Application No. 10-2020-7029161 mailed Dec. 11, 2023, 6 Pages including English translation.
Office Communication for Japanese Patent Application No. JP 2020-548724 mailed Oct. 2, 2023, 05 Pages including English translation.
Extended European Search report for European Patent Application No. EP 20908525.7 mailed Jan. 3, 2024.
Nawaz et al., "Double-Differential-Fed, Dual-Polarized Patch Antenna With 90 dB Interport RF Isolation for a 2.4 GHZ In-Band FullDuplex Transceiver", IEEE Antennas and Wireless Propagation Letters, vol. 17, No. 2, Feb. 2018, pp. 287-290.
International Search Report and Written Opinion for International Patent Application No. PCT/US2023/034033 mailed Dec. 12, 2023, 13 Pages.
International Preliminary Report on Patentability Chapter I for International Patent Application No. PCT/US2022/036381 mailed Jan. 18, 2024, 6 Pages.
Office Communication for Korean Patent Application No. 10-2021-7029953 mailed Jan. 2, 2024, 8 Pages including English translation.
Office Communication for U.S. Appl. No. 17/891,970 mailed Feb. 12, 2024, pp. 1-8.
Decision to Grant for Japanese Patent Application No. JP 2021-505304 mailed Feb. 5, 2024, 06 Pages including English translation.
Office Communication for U.S. Appl. No. 17/980,391 mailed Jul. 3, 2023, pp. 1-9.
Office Communication for U.S. Appl. No. 17/980,391 mailed Nov. 21, 2023, 10 Pages.
Office Communication for U.S. Appl. No. 17/980,391 mailed Apr. 12, 2024, 5 Pages.
Extended European Search Report for European Patent Application No. 21788290.1 mailed Mar. 28, 2024, pp. 1-9.
Office Communication for European Patent Application No. 19844867.2 mailed Apr. 16, 2024, 8 Pages.
International Preliminary Report on Patentability Chapter I for International Patent Application No. PCT/US2022/047909 mailed May 10, 2024, 5 Pages.
Office Communication for European Patent Application No. EP 19772471.9 mailed May 31, 2024, 9 pages.
Extended European Search report for European Patent Application No. EP 21814490.5 mailed May 28, 2024, 12 pages.

(56) References Cited

OTHER PUBLICATIONS

"3rd Generation Partnership Project; Technical Specification Group Services and System Aspects; 3GPP System Architecture Evolution (SAE); Security architecture (Release 15)", 3GPP TS 33.401, V15. 11.0, Mar. 27, 2020 pp. 1-163.
Gemalto et al., "Background information for relay node security solution", 3GPP CT WG6 Meeting#59, C6-110135, Feb. 22-25, 2011, 13 pages.
"Common understanding of repeaters", Qualcomm Incorporated, 3GPP TSG RAN WG4 #98_e, R4-2102829, 2021, Accessed: May 25, 2022, pp. 1-2.
"General views on NR repeater", MediaTek Inc., 3GPP TSG RAN WG4 #98_e, R4-2101156, 2021, Accessed: May 25, 2022, pp. 1-4.
Bjorn Ekman, "Machine Learning for Beam Based Mobility Optimization in NR," Master of Science Thesis in Communication Systems, Department of Electrical Engineering, Linkoping University, 2017, pp. 1-85.
Cheng et al., "Real-time two-dimensional beam steering with gate-tunable materials: a theoretical investigation", Applied Optics, vol. 55, No. 22, Aug. 1, 2016, pp. 6137-6144.
Eric J Black, "Holographic Beam Forming and MIMO," Pivotal Commware, 2017, pp. 1-8.
Falconer et al., "Coverage Enhancement Methods for LMDS," IEEE Communications Magazine, Jul. 2003, vol. 41, Iss. 7, pp. 86-92.
Gao et al., "Holographic Artificial Impedance Surface Antenna Based on Circular Patch", 2018 International Conference on Microwave and Millimeter Wave Technology (ICMMT), 2018, pp. 1-3.
Nishiyama et al., "Polarization Controllable Microstrip Antenna using Beam Lead PIN Diodes", 2006 Asia Pacific Microwave Conference, 2006, pp. 1-4.
Shimura et al., "A study of indoor area expansion by quasi-millimeter wave repeater," The Collection of Lecture Articles of the 2018 IEICE General Conference, Mar. 2018, pp. 1-5.
Vu et al., "Joint Load Balancing and Interference Mitigation in 5G Heterogeneous Networks," IEEE on Wireless Communications, 2017, vol. 16, No. 9, pp. 6032-6046.
Wolf et al., "Phased-Array Sources Based on Nonlinear Metamaterial Nanocavities", Nature Communications, vol. 6, 7667, 2015 Macmillan Publishers Limited, pp. 1-6.
Yurduseven et al., "Dual-Polarization Printed Holographic Multibeam Metasurface Antenna" Aug. 7, IEEE Antennas and Wireless Propagation Letters. pp. 10.1109/LAWP.2017, pp. 1-4.
Examination Report for European Patent Application No. 19772471.9 mailed Jul. 28, 2023, pp. 1-4.
Examination Report No. 1 for Australian Patent Application No. 2019239864, mailed Jul. 7, 2022, pp. 1-3.
Extended European Search Report for European Patent Application No. 19772471.9 mailed Nov. 8, 2021, 1-8 Pages.
Extended European Search Report for European Patent Application No. 19844867.2 mailed Mar. 30, 2022, pp. 1-16.
Extended European Search Report for European Patent Application No. 20759272.6 mailed Nov. 3, 2022, pp. 1-9.
Intention to Grant for European Patent Application No. 20759272.6 mailed Sep. 19, 2023, 11 pages.
International Preliminary Report on Patentability Chapter 1 for International Patent Application No. PCT/US2018/066329 mailed Jul. 23, 2020, pp. 1-7.
International Preliminary Report on Patentability Chapter I for International Patent Application No. PCT/US2019/022987 mailed Oct. 1, 2020, pp. 1-9.
International Preliminary Report on Patentability Chapter I for International Patent Application No. PCT/US2019/041053 mailed Feb. 11, 2021, pp. 1-6.
International Preliminary Report on Patentability Chapter I for International Patent Application No. PCT/US2019/047093 mailed Apr. 1, 2021, pp. 1-5.
International Preliminary Report on Patentability Chapter I for International Patent Application No. PCT/US2020/013713 mailed Aug. 19, 2021, pp. 1-6.
International Preliminary Report on Patentability Chapter I for International Patent Application No. PCT/US2020/016641 mailed Sep. 2, 2021, pp. 1-5.
International Preliminary Report on Patentability Chapter I for International Patent Application No. PCT/US2020/048806 mailed Jul. 14, 2022, pp. 1-7.
International Preliminary Report on Patentability Chapter I for International Patent Application No. PCT/US2021/034479 mailed Dec. 8, 2022, pp. 1-5.
International Preliminary Report on Patentability Chapter I for International Patent Application No. PCT/US2021/043308 mailed Feb. 16, 2023, pp. 1-6.
International Preliminary Report on Patentability Chapter I for International Patent Application No. PCT/US2021/049502 mailed Mar. 23, 2023, pp. 1-6.
International Preliminary Report on Patentability Chapter I for International Patent Application No. PCT/US2022/012613 mailed Jul. 27, 2023, pp. 1-5.
International Preliminary Report on Patentability Chapter I for International Patent Application No. PCT/US2022/013942 mailed Aug. 10, 2023, pp. 1-6.
International Preliminary Report on Patentability Chapter I for International Patent Application No. PCT/US2021/026400 mailed Oct. 27, 2022, pp. 1-5.
International Preliminary Report on Patentability for International Patent Application No. PCT/US2019/022942 mailed Oct. 1, 2020, pp. 1-8.
International Search Report and Written Opinion for International Patent Application No. PCT/US2018/066329 mailed May 31, 2019, pp. 1-8.
International Search Report and Written Opinion for International Patent Application No. PCT/US2019/022942 mailed Jul. 4, 2019, pp. 1-10.
International Search Report and Written Opinion for International Patent Application No. PCT/US2019/022987 mailed Jul. 2, 2019, pp. 1-11.
International Search Report and Written Opinion for International Patent Application No. PCT/US2019/041053 mailed Aug. 27, 2019, pp. 1-7.
International Search Report and Written Opinion for International Patent Application No. PCT/US2019/047093 mailed Oct. 21, 2019, pp. 1-6.
International Search Report and Written Opinion for International Patent Application No. PCT/US2020/013713 mailed Apr. 21, 2020, pp. 1-7.
International Search Report and Written Opinion for International Patent Application No. PCT/US2020/016641 mailed Apr. 14, 2020, pp. 1-6.
International Search Report and Written Opinion for International Patent Application No. PCT/US2020/048806 mailed Nov. 17, 2020, pp. 1-8.
International Search Report and Written Opinion for International Patent Application No. PCT/US2021/026400 mailed Jul. 20, 2021, pp. 1-6.
International Search Report and Written Opinion for International Patent Application No. PCT/US2021/034479 mailed Aug. 10, 2021, pp. 1-6.
International Search Report and Written Opinion for International Patent Application No. PCT/US2021/043308 mailed Nov. 2, 2021, pp. 1-7.
International Search Report and Written Opinion for International Patent Application No. PCT/US2021/049502 mailed Dec. 14, 2021, pp. 1-7.
International Search Report and Written Opinion for International Patent Application No. PCT/US2022/012613 mailed May 10, 2022, pp. 1-7.
International Search Report and Written Opinion for International Patent Application No. PCT/US2022/013942 mailed May 10, 2022, pp. 1-7.
International Search Report and Written Opinion for International Patent Application No. PCT/US2022/036381 mailed Oct. 25, 2022, pp. 1-8.

(56) References Cited

OTHER PUBLICATIONS

International Search Report and Written Opinion for International Patent Application No. PCT/US2022/047909 mailed Feb. 21, 2023, pp. 1-7.
International Search Report and Written Opinion for International Patent Application No. PCT/US2023/018993 mailed Jun. 27, 2023, pp. 1-9.
Notice of Acceptance for Australian Patent Application No. 2019239864 mailed Jan. 16, 2023, pp. 1-3.
Office Communication for Japan Patent Application No. JP 2023-542685 mailed Mar. 18, 2026, 11 pages including English Translation.
Office Communication for European Patent Application No. EP 22746545.7 mailed Mar. 16, 2026, 7 pages.
Office Communication for U.S. Appl. No. 18/374,539 mailed Mar. 20, 2026, 15 Pages.

* cited by examiner

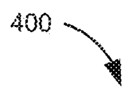

410: instructing a wireless repeater to adjust one or more beamforming antennas to point a plurality of beams at a corresponding plurality of user equipment devices according to a time schedule for communication between the wireless base station and the plurality of user equipment devices via the wireless repeater

420: receiving, from the wireless repeater, a plurality of detected locations for the plurality of user equipment devices

430: transmitting, to the wireless repeater, a beam schedule corresponding to the time schedule, where entries in the beam schedule correspond to the detected locations of the user equipment devices

440: transmitting, to the wireless repeater or to a radio unit in communication with the wireless repeater, downlink electromagnetic signals encoding downlink data to be delivered to the plurality of user equipment devices according to the time schedule

450: receiving, from the wireless repeater or from a radio unit in communication with the wireless repeater, uplink electromagnetic signals encoding uplink data from the plurality of user equipment devices according to the time schedule

FIG. 4

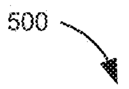

510: receiving, from a wireless base station, a first sequence of synchronization signals

520: repeatedly adjusting a beamforming antenna to transmit a second sequence of synchronization signals with a corresponding sequence of beam patterns within a service area of the wireless repeater

FIG. 5

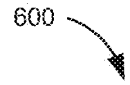

610: during a synchronization signal block sweep, transmitting a plurality of synchronization signal blocks to a wireless repeater for retransmission within a service area of the wireless repeater

FIG. 6

SMART REPEATER SYSTEMS

CROSS-REFERENCE TO RELATED APPLICATION

This Utility Patent Application is a Continuation of U.S. patent application Ser. No. 17/980,391 filed on Nov. 3, 2022, now U.S. Pat. No. 12,010,703 issued on Jun. 11, 2024, which Continuation of U.S. patent application Ser. No. 17/585,418 filed on Jan. 26, 2022, now U.S. Pat. No. 11,497,050 issued on Nov. 8, 2022, which is based on previously filed U.S. Provisional Patent Application No. 63/141,914 filed on Jan. 26, 2021, and U.S. Provisional Patent Application No. 63/174,511 filed on Apr. 13, 2021. The benefits of the filing dates of these applications are hereby claimed under 35 U.S.C. § 119(e) and § 120 and the contents of these applications are herein incorporated by reference in their entirety.

TECHNICAL FIELD

The invention relates generally to employing directional antennas placed on structures, such as poles, or buildings, that provide a wireless network for communicating RF signals between user devices and remotely located resources. Further, in some embodiments, the directional antennas may be installed at the premises of a customer and coupled to base stations and RF signal repeater devices to manage operation of a millimeter wave communications network.

BACKGROUND

Mobile devices have become the primary mode of wireless communication for most people throughout the world. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers and over shorter distances than lower frequency wireless signals. Moreover, since the recent rollout of 5$^{th}$ generation (5G) wireless communication networks that can use wireless signals with millimeter waveforms at gigahertz frequencies, smart RF signal repeater devices for 5G wireless networks are needed to distribute important processes that optimize access for mobile devices due to these physical barriers.

BRIEF DESCRIPTION OF THE DRAWINGS

FIGS. 3-6 depict process flows.

DESCRIPTION OF VARIOUS EMBODIMENTS OF THE INVENTION

Figure 1:
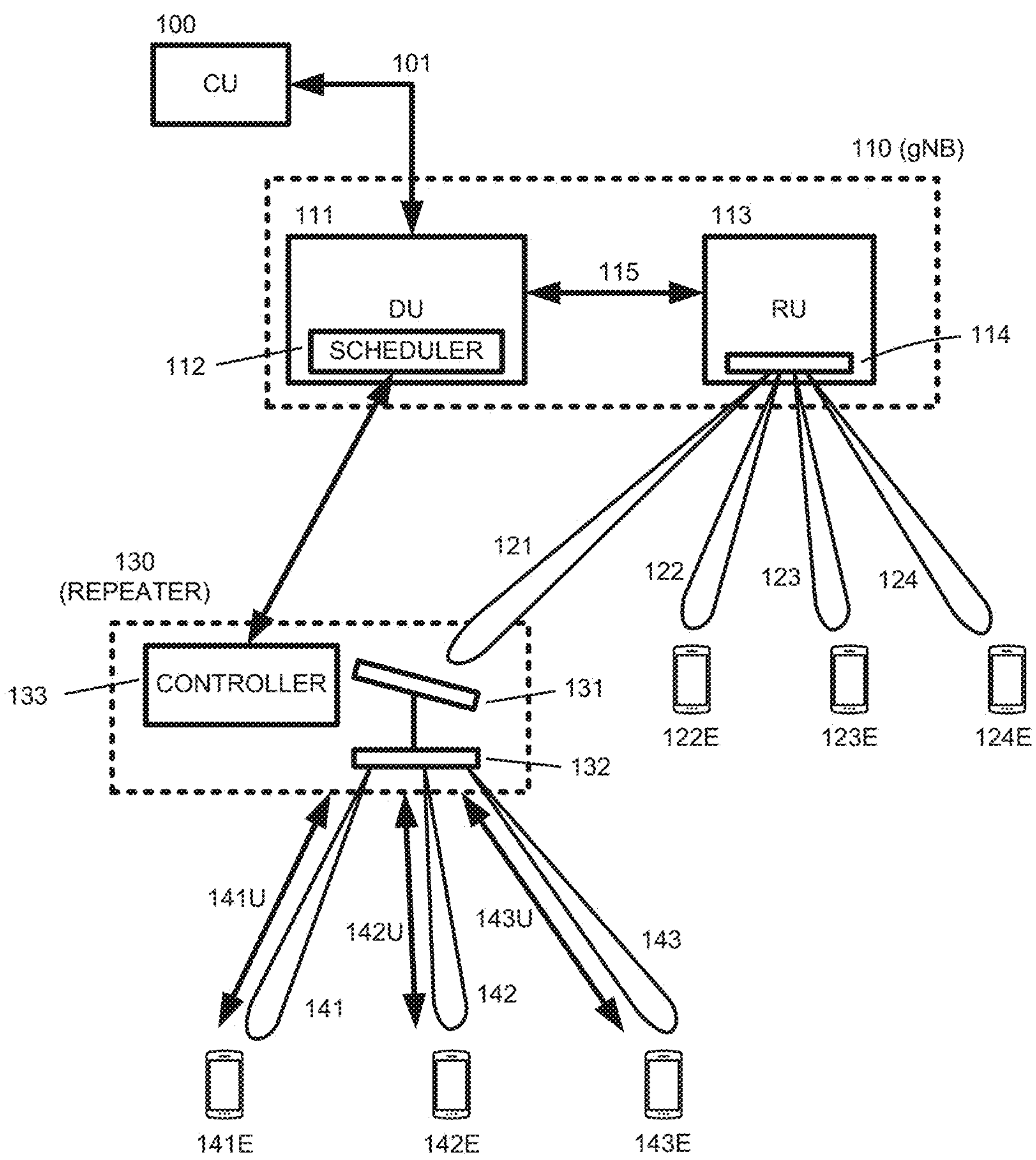
FIG. 1 depicts a wireless communication system.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or system that provides a suite of devices and software applications executing on computing devices, e.g., a distributed cloud computing platform, a desktop computer, a notebook computer, and/or a mobile device. One or more of the various embodiments enables smart RF signal repeater devices to perform many of the functions of 5G base stations, e.g., a next generation NodeB (gNB), to extend millimeter wave (mmWave) coverage for 5G communication networks while reducing costs, increasing versatility, and optimizing coverage for UEs. In one or more of the various embodiments, the devices may include outdoor network repeaters, e.g., the Pivot 5G™, and indoor subscriber repeaters, e.g., the Echo 5G™, and other mmWave network transmitter devices in a mm Wave network. In one or more embodiments, the novel invention may be employed with different types of 5G wireless communication networks, e.g., Open Radio Access Network (O-RAN), Next Gen Radio Access Network (NG-RAN), or the like. Various embodiments enable smart RF signal repeater devices to perform many of the functions of 5G base stations to extend millimeter wave coverage for 5G communication networks, such as an Open Radio Access Network (O-RAN) network, while reducing costs, increasing versatility and optimizing coverage.

Illustrative Wireless Communication Systems

With reference now to FIG. 1, embodiments are illustrated with a block diagram of a wireless communication system. A wireless communication system, such as a 5G communication network operating under Open Radio Access Network (O-RAN) or Next Gen Radio Access (NG-RAN) standards, can include, for example, a Central Unit or CU 100. The CU 100 interfaces via interface 101 with one or more Distributed Units or DUs 111, which are typically located on site at a wireless base station such as a gNobeB base station 110. The CU can be co-located with the DU or it can be remote, e.g., with a cloud deployment of the CU.

The DU 111 can include a scheduler 112 which determines schedule information for communication with various user equipment (UE) devices within a service area of the gNodeB. The schedule information can include, for example, information about time intervals in which selected beams are to be directed towards selected regions within the service area of the gNodeB, information about orthogonal frequency division multiplexing (OFDM) for communication with the UE devices within the service area of the gNodeB, and/or information about time intervals for uplink or downlink communication with the UE devices within the service area of the gNodeB.

The gNodeB 110 can include a radio unit or RU 113 which interfaces with the DU 111 via interface 115. The RU can convert downlink digital signals received from the DU into downlink radio signals (e.g., downlink mm Wave signals) to be transmitted to UE devices within the service area of the gNodeB. The RU can also receive uplink radio signals (e.g., uplink mmWave signals) from UE devices within the service area of the gNodeB, convert these into uplink digital signals, and communicate the uplink digital signals to the DU.

While FIG. 1 depicts the gNB has having a DU 111 that is distinct from the RU 113, in some scenarios, the functions of the DU and RU can be merged as a single unit, e.g., without a well-defined interface 115 separating these functional units. For these approaches, the descriptions herein of various functions of the DU and/or the RU can be understood to describe functions of the combined unit operating as unitary gNodeB 110.

In some approaches the RU includes one or more adjustable uplink and/or downlink RF antennas 114 that are adjustable to cast a set of spatially diverse beams covering a service area of the gNodeB (depicted schematically as beams 121-124). Accordingly, the scheduler can share schedule information with the RU, e.g., information about time intervals in which selected beams are to be directed towards selected regions within the service area of the gNodeB. Thus, for example, beams 122, 123, and 124 may address user equipment 122E, 123E, and 124E, respectively.

In some scenarios the set of diverse beams 121-124 from the RU may not cover the entirety of a desired service area. For example, especially at mmWave frequencies, signals may attenuate more rapidly with spatial distance from the gNodeB, or signals may be blocked by line-of-sight obstructions such as foliage, landscape, or man-made structures such as walls or buildings. Accordingly, embodiments can include one or more repeaters 130 to expand the service area of the gNodeB.

Repeater 130 can include a donor antenna unit 131 including one or more antennas configured to communicate with the RU, e.g., by receiving downlink radio signals from the RU and by transmitting uplink radio signals to the RU. In some approaches, the donor antenna unit includes one or more static directional antennas that are oriented to point a beam towards the RU. In other approaches, the donor antenna unit includes one or more adjustable antennas that can be dynamically adjusted to point a beam towards the RU. For example, the donor antenna unit can include one or more phased array antennas. Alternatively or additionally, the donor antenna unit can include one or more holographic beamforming antennas. Repeaters that include holographic beamforming antennas are described, for example, in U.S. Pat. No. 10,425,905, which is herein incorporated by reference.

Repeater 130 can also include a service antenna unit 132 with one or more antennas configured to rebroadcast the signals received or transmitted by the donor antenna unit 131. For example, if the donor antenna unit 131 receives downlink radio signals from the RU via beam 121, the service antenna unit 132 can rebroadcast the downlink radio signals by casting a set of diverse beams 141-143 covering an extended service area of the gNodeB (that is, extended by virtue of the repeater installation). For example, beams 141, 142, and 143 may address user equipment 141E, 142E, and 143E that are out of range or out of line of sight of the RU 113. Similarly, if the service antenna unit 132 receives uplink radio signals from the user equipment 141E, 142E, and 143E via the beams 141, 142, and 143, respectively, the donor antenna unit 131 can rebroadcast the uplink radio signals to the RU via beam 121.

The service antenna unit can include one or more adjustable antennas that can be dynamically adjusted to cast a set of spatially diverse beams covering an extended service area of the gNodeB (depicted schematically as beams 141-143). For example, the service antenna unit can include one or more phased array antennas. Alternatively or additionally, the service antenna unit can include one or more holographic beamforming antennas. Repeaters that include holographic beamforming antennas are described, for example, in U.S. Pat. No. 10,425,905, which is herein incorporated by reference.

Repeater 130 can include a controller unit 133 that receives schedule information via interface 134 from the scheduler 112 and uses this schedule information to dynamically adjust the antennas of the service antenna unit. For example, if the schedule information includes information about time intervals in which selected beams (e.g., beams 141-143) are to be directed towards selected regions within the extended service area of the gNodeB, the controller unit 133 can dynamically adjust the antennas of the service antenna to cast these beams according to the prescribed time intervals.

In some approaches, the interface 134 can be provided by a wired connection between the DU 111 and the repeater 130, such as an ethernet cable, a coaxial cable, or an optical fiber connection.

In other approaches, the interface 134 can be provided by a wireless connection between the DU 111 and the repeater 130. As a first example, the interface 134 can be provided by an out-of-band wireless connection between the DU and the repeater, i.e., a wireless connection in a frequency band distinct from any frequency band(s) used by the RU 113. The out-of-band frequency band can be, for example, a private or unlicensed frequency band. As a second example, the interface 134 can be provided by a wireless connection using a 5G ultra-reliable low-latency communications (URLLC) protocol. In some scenarios (not depicted), the interface 134 for schedule information can be provided as a component of the radio signals that are transmitted by the RU 113 to the repeater 130 via the beam 121.

In some scenarios, user equipment devices, such as UEs 141E, 142E, and 143E within an extended service area of the gNodeB 110 as extended by virtue of the repeater 130, can make uplink grant requests which need to be forwarded by the repeater to the DU 111. Uplink grant requests for UEs 141E, 142E, and 143E can be communicated with repeater 130 via interfaces 141U, 142U, and 143U, respectively. In some approaches, the interfaces 141U-143U can be provided by an out-of-band wireless connection between the UEs 141-143E and the repeater 130. The out-of-band frequency band can be, for example, a private or unlicensed frequency band. In other approaches, the interfaces 141U-143U can be provided by a wireless connection using a 5G ultra-reliable low-latency communications (URLLC) protocol.

In yet other approaches, the interfaces 141U-143U can be provided via 5G sidelink communications between the repeater 130 and each UE 141E-143E. Generally speaking, 5G New Radio standards can include protocols for direct sidelink communications between user equipment devices without relaying those communications through a gNodeB. In this sidelink approach for the interfaces 141U-143U, the repeater 130 can be equipped with a module for direct sidelink communication (e.g. a 5G cellular modem or the like), and this module can thus enable direct side link communication between the repeater 130 and the user equipment 141E-143E to receive uplink grant requests.

In FIG. 1, the RU 113 is depicted as transmitting downlink radio signals (and receiving uplink radio signals) wirelessly via beam 121 between the RU 113 and the repeater 130. In other approaches, however, the RU may transmit the downlink radio signals and receive the uplink radio signals via a wired connection between the RU and the repeater. The wired connection could include, for example, a coaxial cable or an optical fiber configured for RF-over-fiber transmission. In these approaches, the donor antenna unit 131 may be replaced with a wired connection port. In yet other approaches, the repeater may not be coupled to an RU at all; for example, the repeater may have a wired connection with the DU 111. In these other approaches, the repeater can convert downlink digital signals received from the DU over the wired connection into downlink radio signals to be transmitted to UE devices within the extended service area of the repeater, and/or the repeater can receive uplink radio signals from UE devices within the extended service area of the repeater, convert these into uplink digital signals, and communicate the uplink digital signals to the DU. Essentially, in these other approaches, the repeater can function as a new radio unit for the wireless communication system.

Synchronization Signal Blocks

Figure 2A:
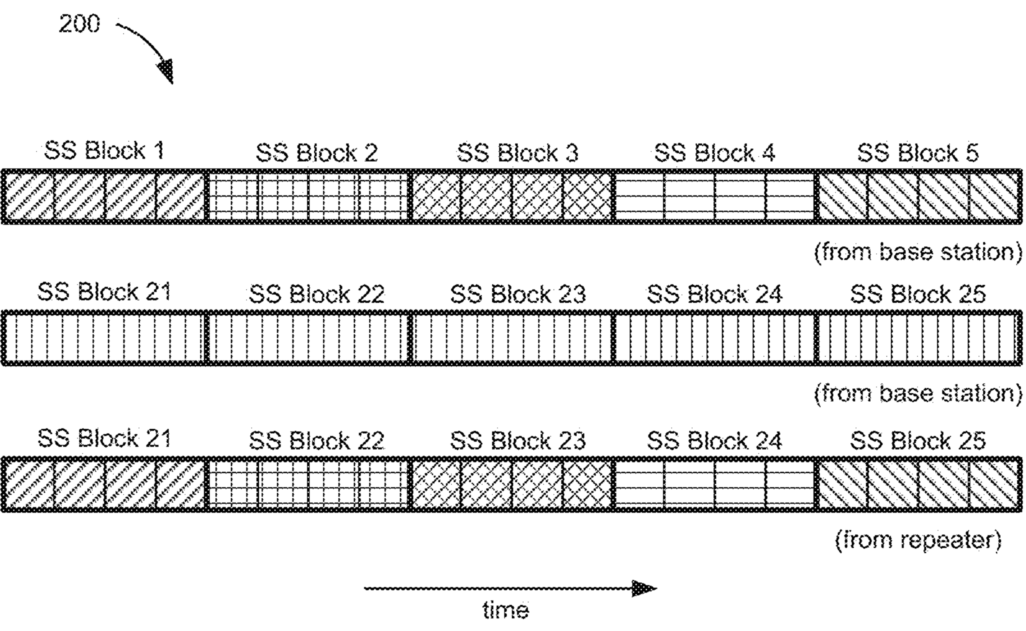
FIGS. 2A and 2B depict synchronization signal block sweep that includes a repeater.
Figure 2B:
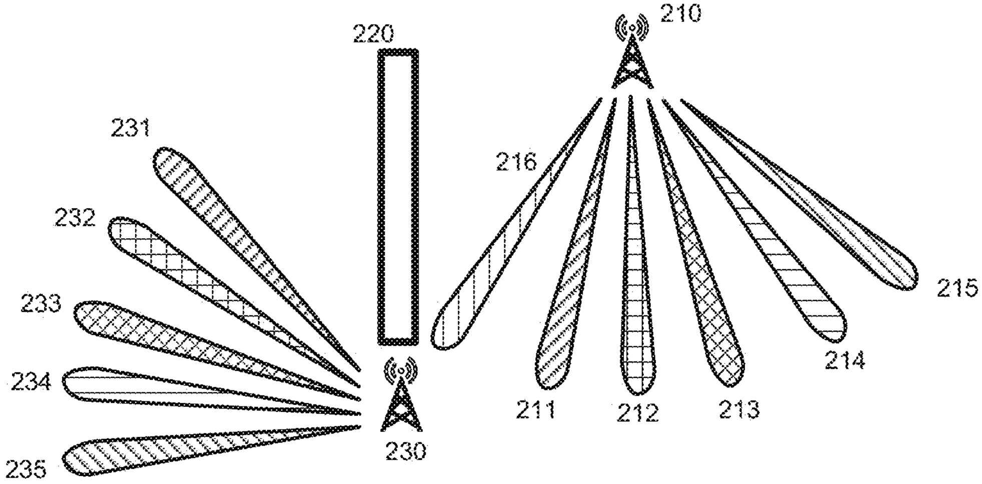

Wireless communication systems such as 5G communication systems may use synchronization signal block sweeps to synchronize communications between a wireless base station (e.g., a gNodeB base station) and user equipment located within a service area of the wireless base station. An illustrative example is depicted in FIGS. 2A and 2B. Generally speaking, a synchronization sequence 200 can include a sequence of synchronization signal blocks (e.g., SS Block 1, SS Block 2, . . . , SS Block 25), and these synchronization signal blocks can correspond to a sequence of beams patterns within a service area of the base station. In some approaches, the sequence of beam patterns can be a raster sequence of narrow beam patterns that collectively fill a service area of the wireless base station. For example, SS Blocks 1-5 of FIG. 2A can correspond to beam patterns 211-215 by a beamforming antenna at the base station 210 as shown in FIG. 2B.

In some approaches, the sequence of beam patterns can be a sequence of vertical fan beam patterns each having a narrow horizontal beam width and a wide vertical beam width, e.g., to cover a horizontal service area such as flat terrain around the wireless base station. In other approaches, the sequence of beam patterns can be a sequence of horizontal fan beam patterns each having a wide horizontal beam width and a narrow vertical beam width, e.g., to cover a vertical service area such as stories of a high-rise building. In yet other approaches, the sequence of beam patterns can be a pseudorandom or compressive imaging sequence of beam patterns that collectively fill the service area.

As discussed above in the context of FIG. 1, in some scenarios, a repeater can be installed to extend a service area of the base station. For example, especially at mm Wave frequencies, signals may attenuate more rapidly with spatial distance from the base station (such as a gNodeB), or signals may be blocked by line-of-sight obstructions such as foliage, landscape, or man-made structures such as walls or buildings. The limitation on the service area of the base station is schematically illustrated by the obstruction 220 in FIG. 2B, with repeater 230 installed to extend the service area of the base station to evade the obstruction.

To synchronize communications between the base station 210 and user equipment within the extended service area of the wireless base station, the repeater 230 can repeat synchronization signals that are received from the base station 210. For example, the wireless base station can dedicate multiple beams (e.g., corresponding to SS Blocks 21-25 in FIG. 2A) for repeating by the repeater 230, and synchronization signals for these SS Blocks 21-25 can be transmitted by the base station 210 to the repeater 230 via a single beam 216 that addresses the repeater. Then, the repeater can retransmit the synchronization signals for SS Blocks 21-25 using a sequence of beam patterns 231-235 that collectively fill the extended service area of the wireless base station, e.g., the area that is outside of the line of sight of the base station.

As with the sequence of beam patterns for the base station, the sequence of repeated beam patterns can be sequence of vertical fan beam patterns, a sequence of horizontal fan beam patterns, a pseudorandom or compressive imaging sequence of beam patterns, or any other sequence that collectively fills the extended service area that is serviced by the repeater.

In some approaches, the repeater can receive the synchronization signals from the base station and retransmit the signals into the extended service area without decoding the signals. In other approaches, the repeater can receive the synchronization signals, decode or demodulate the signals, and then encode or remodulate the synchronization signals for rebroadcast into the extended service area.

In various approaches, the repeater can receive schedule information from the base station about the schedule of synchronization signals. Analogous to the discussion above in the context of FIG. 1, this schedule information can be received via a wired interface (e.g., an ethernet cable, coaxial cable, optical fiber, or the like) or via a wireless interface (e.g., an out-of-band signal in a private or unlicensed frequency band, a URLLC communication, or the like).

Process Flows

Figure 3:
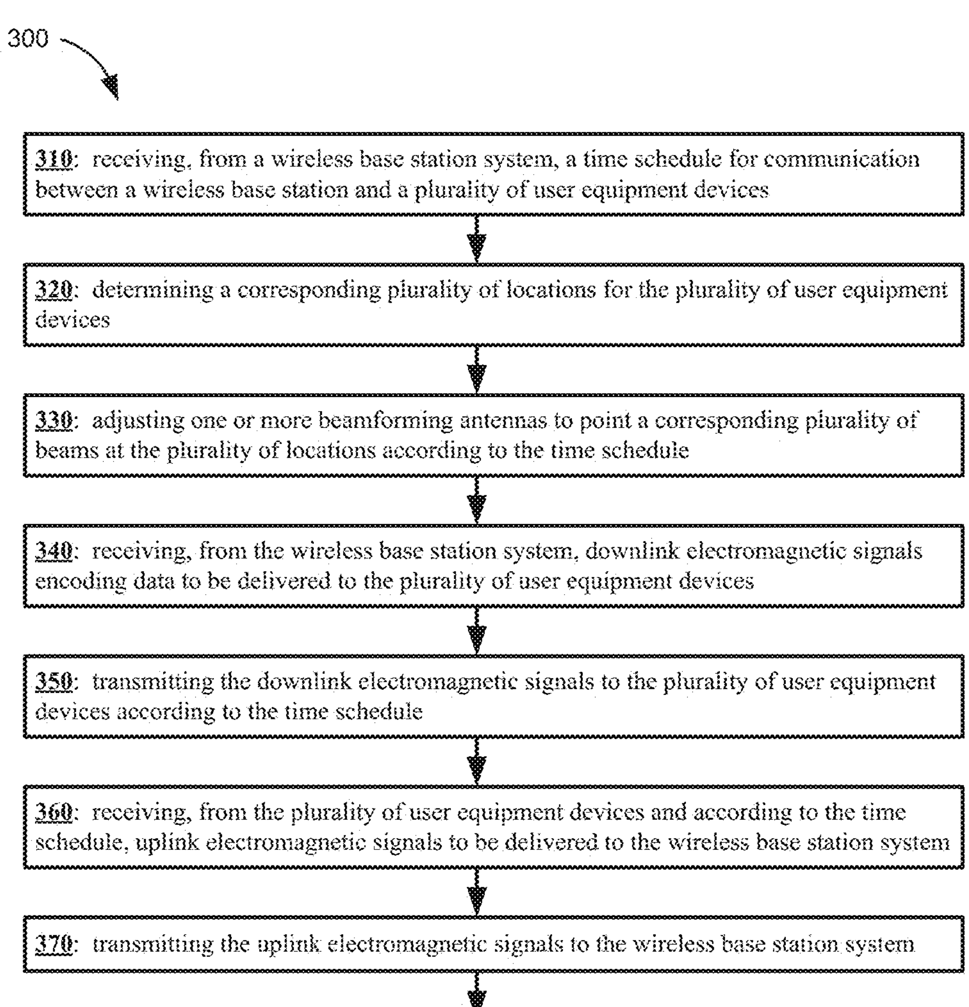

With reference now to FIG. 3, an illustrative embodiment is depicted as a process flow diagram. Process 300 includes operation 310—receiving, from a wireless base station system, a time schedule for communication between a wireless base station and a plurality of user equipment devices. For example, repeater 130 in FIG. 1 can receive schedule information via interface 134 with schedule 112 of DU 111.

Process 300 further includes operation 320—determining a corresponding plurality of locations for the plurality of user equipment devices. For example, repeater 130 in FIG. 1 can determine locations of UEs 141E, 142E, and 143E. In some approaches, the locations can be determined by adjusting one or more beamforming antennas of the repeater 130 to illuminate a field of view of the wireless repeater with a succession of beams that collectively span the field of view, and then receiving, from each of the user equipment devices within the field of view, a response indicating which beam in the succession of beams corresponds to the location of that user equipment device.

Process 300 further includes operation 330—adjusting one or more beamforming antennas to point a corresponding plurality of beams at the plurality of locations according to the time schedule. For example, in FIG. 1, controller unit 133 can control the service antenna unit 132 to cast a succession of beams 141, 142, 143 according to the time schedule.

Process 300 further includes operation 340—receiving, from the wireless base station system, downlink electromagnetic signals encoding data to be delivered to the plurality of user equipment devices; and operation 350—transmitting the downlink electromagnetic signals to the plurality of user equipment devices according to the time schedule. For example, repeater 130 in FIG. 1 can receive downlink electromagnetic signals with the donor antenna unit 131 via beam 121 from RU 113 and retransmit the received downlink electromagnetic signals with the service antenna unit 132 via beams 141, 142, and 143 to user equipment 141E, 142E, and 143E, respectively.

Process 300 further includes operation 360—receiving, from the plurality of user equipment devices and according to the time schedule, uplink electromagnetic signals to be delivered to the wireless base station system; and operation 370—transmitting the uplink electromagnetic signals to the wireless base station system. For example, repeater 130 in FIG. 1 can receive uplink electromagnetic signals from user equipment 141E, 142E, and 143E with the service antenna unit 132 via beams 141, 142, and 143, respectively, and retransmit these uplink signals with the donor antenna unit 131 to the RU 113 via beam 121.

Process 300 further includes operation 380—receiving, from the plurality of user equipment devices, a corresponding plurality of uplink grant requests; and operation 390—transmitting the plurality of uplink grant requests to the wireless base station system. For example, repeater 131 in FIG. 1 can receive uplink grant requests from user equipment 141E, 142E and 143E via interfaces 141U, 142U, and 143U, respectively.

With reference now to FIG. 4, another illustrative embodiment is depicted as a process flow diagram. Process 400 includes operation 410—instructing a wireless repeater to adjust one or more beamforming antennas to point a plurality of beams at a corresponding plurality of user equipment devices according to a time schedule for communication between the wireless base station and the plurality of user equipment devices via the wireless repeater. For example, base station 110 in FIG. 1 can communicate schedule information to repeater 130 via interface 134.

Process 400 further includes operation 420—receiving, from the wireless repeater, a plurality of detected locations for the plurality of user equipment devices; and operation 430—transmitting, to the wireless repeater, a beam schedule corresponding to the time schedule, where entries in the beam schedule correspond to the detected locations of the user equipment devices. For example, if the repeater 130 of FIG. 1 detects the locations of user equipment 141E, 142E, and 143E (e.g., via operation 320 above), the repeater can communicate information about those detected locations to the base station 110 via interface 134, and the base station can subsequently communicate a beam schedule to the repeater for casting beams 141, 142, and 143 to the detected user equipment 141E, 142E, and 143E, respectively.

Process 400 further includes operation 440—transmitting, to the wireless repeater or to a radio unit in communication with the wireless repeater, downlink electromagnetic signals encoding downlink data to be delivered to the plurality of user equipment devices according to the time schedule. For example, base station 110 in FIG. 1 can transmit downlink electromagnetic signals to repeater 130 via beam 121.

Process 400 further includes operation 450—receiving, from the wireless repeater or from a radio unit in communication with the wireless repeater, uplink electromagnetic signals encoding uplink data from the plurality of user equipment devices according to the time schedule. For example, base station 110 in FIG. 1 can receive downlink electromagnetic signals from repeater 130 via beam 121.

With reference now to FIG. 5, another illustrative embodiment is depicted as a process flow diagram. Process 500 includes operation 510—receiving, from a wireless base station, a first sequence of synchronization signals. For example, in FIGS. 2A-2B, repeater 230 can receive synchronization signals from base station 210 via beam 216, where the synchronization signals correspond to SS Blocks 21-25.

Process 500 further includes operation 520—repeatedly adjusting a beamforming antenna to transmit a second sequence of synchronization signals with a corresponding sequence of beam patterns within a service area of the wireless repeater. For example, in FIGS. 2A-2B, repeater 230 can transmit synchronization signals for SS Blocks 21-25 using a sequence of beam patterns 231-235.

With reference now to FIG. 6, another illustrative embodiment is depicted as a process flow diagram. Process 600 includes operation 610—during a synchronization signal block sweep, transmitting a plurality of synchronization signal blocks to a wireless repeater for retransmission within a service area of the wireless repeater. For example, in FIGS. 2A-2B, base station 210 can transmit synchronization signals for SS Blocks 21-25 to repeater 230 via beam 216.

Additionally, in one or more embodiments, a wireless repeater may include one or more beamforming antennas, one or more processors coupled to one or more memories having instructions stored thereon to cause the wireless repeater to carry out any of the methods disclosed throughout the specification herein. Further, in one or more embodiments, a computer-readable medium may store instructions to cause the wireless repeater to carry out any of the methods disclosed throughout the specification herein.

Also, in one or more embodiments, a method of operating a wireless base station system may be configured to provide for instructing a wireless repeater to adjust one or more beamforming antennas to point a plurality of beams at a corresponding plurality of user equipment devices according to a time schedule for communication between the wireless base station and the plurality of user equipment devices via the wireless repeater. Further, in one or more embodiments, the one or more beamforming antennas may include one or more holographic beamforming antennas. Additionally, in one or more embodiments, the instructing includes transmitting the time schedule to the wireless repeater. Also, in one or more embodiments, the method of operating the wireless base station may include: receiving, from the wireless repeater, a plurality of detected locations for the plurality of user equipment devices; and transmitting, to the wireless repeater, a beam schedule corresponding to the time schedule, where entries in the beam schedule correspond to the detected locations of the user equipment devices. Additionally, in yet one or more other embodiments, the method of operating the wireless base station may include transmitting, to the wireless repeater, downlink electromagnetic signals encoding data to be delivered to the plurality of user equipment devices according to the time schedule. Also, in yet one or more other embodiments, the method of operating the wireless base station may include: transmitting, to a radio unit in communication with the wireless repeater, downlink electromagnetic signals encoding data to be delivered to the plurality of user equipment devices according to the time schedule. Further, in yet one or more other embodiments, the method of operating the wireless repeater may include receiving, from the wireless repeater, uplink electromagnetic signals encoding uplink data from the plurality of user equipment devices according to the time schedule. Moreover, in yet one or more other embodiments, the method of operating the wireless repeater system may include receiving, from a radio unit in communication with the wireless repeater, uplink electromagnetic signals encoding uplink data from the plurality of user equipment devices according to the time schedule.

Furthermore, in one or more embodiments, a method of operating a wireless repeater may include: receiving, from a wireless base station, a first sequence of synchronization signals; and repeatedly adjusting a beamforming antenna to transmit a second sequence of synchronization signals with a corresponding sequence of beam patterns within a service area of the wireless repeater. Also, in one or more embodiments, the second sequence is equal to the first sequence. Additionally, in one or more embodiments, the method of operating the wireless repeater may include: demodulating the first sequence of synchronization signals; and remodulating the demodulated first sequence of synchronization signals to provide the second sequence of synchronization signals. Moreover, in one or more embodiments, the method of operating the wireless repeater may include receiving, from the wireless base station via an out-of-band channel, a schedule for the first sequence of synchronization signals. Further, in one or more embodiments, the wireless base station is a Next Generation NodeB (gNB) for 5G wireless communications. Also, in one or more embodiments, the beamforming antenna is a holographic beamforming antenna. Additionally, in one or more embodiments, the sequence of beam patterns is a raster sequence of narrow beam patterns that collectively fill the service area. Further, in one or more embodiments, the sequence of beam patterns is a pseudorandom or compressive imaging sequence of beam patterns that collectively fill the service area. Moreover, in one or more embodiments, the narrow beam patterns are vertical fan beam patterns having a narrow horizontal beam width and a wide vertical beam width. Also, in one or more embodiments, the narrow beam patterns are horizontal fan beam patterns having a wide horizontal beam width and a narrow vertical beam width. Additionally, in one or more embodiments, the service area of the wireless repeater includes an area outside of a service area of the wireless base station. Further, in one or more embodiments, the service area of the wireless base station is a service area limited by line of sight, foliage loss, distance, or fade. Moreover, in one or more embodiments, the sequence of beam patterns collectively fills the area outside of the service area of the wireless base station.

Furthermore, in one or more embodiments, a method of operating a wireless base station may include, during a synchronization signal block sweep, transmitting a plurality of synchronization signal blocks to a wireless repeater for retransmission within a service area of the wireless repeater. Also, in one or more embodiments, the method of operating the wireless base station may include: the synchronization signal block sweep includes a sweep through a plurality of beam patterns; identifying a beam pattern from the plurality of beam patterns that addresses the wireless repeater; and transmitting of the plurality of synchronization signal blocks to the wireless repeater for retransmission is a transmitting with the identified beam pattern. Additionally, in one or more embodiments, the service area of the wireless repeater includes an area outside of a service area of the wireless base station. Further, in one or more embodiments, the service area of the wireless base station is a service area limited by line of sight, foliage loss, distance, or fade. Moreover, in one or more embodiments, the wireless base station is a Next Generation NodeB (gNB) base station for 5G wireless communications.

In one or more embodiments (not shown in the figures), a computing device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like. Additionally, in one or more embodiments, the computational resources may be distributed over a cloud computing platform and the like.

What is claimed as new and desired to be protected by Letters Patent of the United States is:

1. A method for operating a wireless repeater, comprising:

receiving a set of beam patterns, wherein each beam pattern includes a horizontal beam width and a vertical beam width that are preconfigured to improve beam coverage of terrain in one or more predetermined portions of a target service area that includes one or user equipment devices, wherein the terrain includes one or more of a flat open space, foliage, an obstruction, or a building; and adjusting one or more beamforming antennas to point a plurality of beams at the target service area, wherein the vertical width and horizontal width of each beam pattern is used to determine a shape of a waveform for each beam that corresponds to each predetermined portion of the target service area; and adjusting a direction of one or more of the plurality of beams to point in a direction towards one or more user equipment devices that respond to one or more synchronization signals that are beamed to the target service area.

2. The method of claim 1, wherein the plurality of beams are millimeter wave communication signals.

3. The method of claim 1, further comprising:

a cloud computing platform that is in communication with the wireless repeater, wherein the set of beam patterns are sent by the cloud computing platform to the wireless repeater over a network.

4. The method of claim 1, further comprising:

employing non-millimeter wave communication signals to remotely monitor and manage operation of the wireless repeater.

5. The method of claim 1, wherein the one or more beam forming antennas are holographic beamforming antennas.

6. The method of claim 1, further comprising:

employing a time schedule for the wireless repeater to repeatedly enable communication between a wireless base station and the one or more user equipment devices.

7. The method of claim 1, further comprising:

employing a fifth or greater generation wireless communication network to provide communication between the wireless repeater and the one or more user equipment devices including one or more of a Open Radio Access Network (O-RAN), or a Next Gen Radio Access Network (NG-RAN).

8. An apparatus for a wireless repeater, comprising:

one or more beamforming antennas; and one or more processors coupled to one or more memories having instructions stored therein, wherein execution of the instructions causes actions, including:

receiving a set of beam patterns, wherein each beam pattern includes a horizontal beam width and a vertical beam width that are preconfigured to improve beam coverage of terrain in one or more predetermined portions of a target service area that includes one or user equipment devices, wherein the terrain includes one or more of a flat open space, foliage, an obstruction, or a building; and adjusting one or more beamforming antennas to point a plurality of beams at the target service area, wherein the vertical width and horizontal width of each beam pattern is used to determine a shape of a waveform for each beam that corresponds to each predetermined portion of the target service area; and adjusting a direction of one or more of the plurality of beams to point in a direction towards one or more user equipment devices that respond to one or more synchronization signals that are beamed to the target service area.

9. The apparatus of claim 8, wherein the plurality of beams are millimeter wave communication signals.

10. The apparatus of claim 8, further comprising:

a cloud computing platform that is in communication with the wireless repeater, wherein the set of beam patterns are sent by the cloud computing platform to the wireless repeater over a network.

11. The apparatus of claim 8, further comprising:

employing non-millimeter wave communication signals to remotely monitor and manage operation of the wireless repeater.

12. The apparatus of claim 8, wherein the one or more beam forming antennas are holographic beamforming antennas.

13. The apparatus of claim 8, further comprising:

employing a time schedule for the wireless repeater to repeatedly enable communication between a wireless base station and the one or more user equipment devices.

14. The apparatus of claim 8, further comprising:

employing a fifth or greater generation wireless communication network to provide communication between the wireless repeater and the one or more user equipment devices including one or more of a Open Radio Access Network (O-RAN), or a Next Gen Radio Access Network (NG-RAN).

15. A processor readable non-transitory media that includes instructions for operating a wireless repeater, wherein execution of the instructions by one or more processors causes actions, comprising:

receiving a set of beam patterns, wherein each beam pattern includes a horizontal beam width and a vertical beam width that are preconfigured to improve beam coverage of terrain in one or more predetermined portions of a target service area that includes one or user equipment devices, wherein the terrain includes one or more of a flat open space, foliage, an obstruction, or a building; and adjusting one or more beamforming antennas to point a plurality of beams at the target service area, wherein the vertical width and horizontal width of each beam pattern is used to determine a shape of a waveform for each beam that corresponds to each predetermined portion of the target service area; and adjusting a direction of one or more of the plurality of beams to point in a direction towards one or more user equipment devices that respond to one or more synchronization signals that are beamed to the target service area.

16. The processor readable non-transitory media of claim 15, wherein the plurality of beams are millimeter wave communication signals.

17. The processor readable non-transitory media of claim 15, further comprising:

a cloud computing platform that is in communication with the wireless repeater, wherein the set of beam patterns are sent by the cloud computing platform to the wireless repeater over a network.

18. The processor readable non-transitory media of claim 15, further comprising:

employing non-millimeter wave communication signals to remotely monitor and manage operation of the wireless repeater.

19. The processor readable non-transitory media of claim 15, further comprising:

employing a time schedule for the wireless repeater to repeatedly enable communication between a wireless base station and the one or more user equipment devices.

20. The processor readable non-transitory media of claim 15, further comprising:

employing a fifth or greater generation wireless communication network to provide communication between the wireless repeater and the one or more user equipment devices including one or more of a Open Radio Access Network (O-RAN), or a Next Gen Radio Access Network (NG-RAN).

* * * * *